(12) United States Patent
Billot et al.

(10) Patent No.: US 9,499,130 B2
(45) Date of Patent: Nov. 22, 2016

(54) SEMI-RIGID WINDSHIELD WIPER BLADE HAVING AN OFFSET SPOILER

(75) Inventors: Philippe Billot, Montigny (FR); Franck Cathala, St. Martin Laguepie (FR);
(Continued)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 14/131,985

(22) PCT Filed: Jun. 25, 2012

(86) PCT No.: PCT/EP2012/062179
§ 371 (c)(1),
(2), (4) Date: Jan. 30, 2014

(87) PCT Pub. No.: WO2013/007499
PCT Pub. Date: Jan. 17, 2013

(65) Prior Publication Data
US 2014/0143974 A1    May 29, 2014

(30) Foreign Application Priority Data
Jul. 12, 2011 (FR) ..................... 11 56336

(51) Int. Cl.
*B60S 1/38* (2006.01)
(52) U.S. Cl.
CPC ............. *B60S 1/3808* (2013.01); *B60S 1/381* (2013.01); *B60S 1/3877* (2013.01); *B60S 1/3879* (2013.01);
(Continued)

(58) Field of Classification Search
CPC .............. B60S 1/381; B60S 1/3808; B60S 1/3806; B60S 1/38; B60S 1/3881; B60S 2001/3836
(Continued)

(56) References Cited

U.S. PATENT DOCUMENTS 6,523,218 B1 * 2/2003 Kotlarski ................. 15/250.201
6,874,195 B2 * 4/2005 Kotlarski et al. ........ 15/250.201
(Continued)

FOREIGN PATENT DOCUMENTS

DE    100 07 811 A1    9/2001
DE    10319346 A1 * 12/2003
(Continued)

OTHER PUBLICATIONS

International Search Report for corresponding International Application No. PCT/EP2012/062179, mailed Aug. 2, 2012 (6 pages).
(Continued)

*Primary Examiner* — Gary Graham
(74) *Attorney, Agent, or Firm* — Osha Liang LLP

(57) ABSTRACT

The invention relates to a windshield wiper blade for a vehicle, particularly an automobile, comprising a scraper blade (1), a body (2) to which said scraper blade (1) is attached, and a spoiler (3) extending from said body and having an aerodynamic profile between a leading edge and a trailing edge, the boundary of the wiper blade between the body (2) and the spoiler (3) being defined by a horizontal surface extending through the leading edge of said profile, characterized in that said spoiler extends horizontally in the downstream direction beyond an optionally abstract portion defined so as to constitute the mirror image, relative to a vertical plane extending through a lower end of the scraper blade (1), of the portion of the body that is located upstream of said same vertical plane.

2 Claims, 3 Drawing Sheets

(75) Inventors: Grégory Villemin, Elancourt (FR)

(52) U.S. Cl.
CPC ....... *B60S 1/3881* (2013.01); *B60S 2001/3836* (2013.01)

(58) Field of Classification Search
USPC .......... 15/250.201, 250.48, 250.361, 250.43, 15/250.44
See application file for complete search history.

(56) References Cited

U.S. PATENT DOCUMENTS

| 2007/0022556 | A1  | 2/2007 | Walworth et al. | |
|---|---|---|---|---|
| 2007/0180642 | A1* | 8/2007 | Kim | 15/250.201 |
| 2008/0022478 | A1* | 1/2008 | Jarasson et al. | 15/250.201 |
| 2009/0056049 | A1* | 3/2009 | Jarasson et al. | 15/250.32 |
| 2011/0088192 | A1* | 4/2011 | Wunsch | B60S 1/38 15/250.351 |

FOREIGN PATENT DOCUMENTS

| EP | 2 319 739 A2 | | 5/2011 |
|---|---|---|---|
| FR | 2943020 | * | 9/2010 |
| FR | 2945260 | * | 11/2010 |
| FR | 2945260 B1 | | 6/2011 |
| KR | 10-0651086 B1 | | 11/2006 |
| WO | 2009/065648 A1 | | 5/2009 |
| WO | WO2010/098877 A1 | * | 9/2010 |

OTHER PUBLICATIONS

Office Action in corresponding Chinese application No. 201280044299.X, dated Apr. 12, 2016 (38 pages).

* cited by examiner

SEMI-RIGID WINDSHIELD WIPER BLADE HAVING AN OFFSET SPOILER

The field of the present invention is that of vehicle equipment and more particularly that of the equipment for wiping automotive vehicle windshields.

Motor vehicles are commonly fitted with wiper systems to clear the windshield and prevent the driver's view of his surroundings being impaired. These wipers are conventionally driven by an arm which moves angularly back and forth and comprise elongate blades, themselves bearing blade rubbers made of an elastic material. These blade rubbers rub against the windshield and remove the water by clearing it away from the driver's field of view. The blades are made in the form either, in a conventional version, of articulated frames which hold the blade rubber at several points or, in a more recent version referred to as "flat blade", of a semi-rigid assembly which holds the blade rubber along its entire length.

A semi-rigid wiper blade of the flat blade type is conventionally made up of three elements which extend all along the blade: in this order, starting from the windshield and moving out at right angles thereto, there are: a flexible part made of elastomer constituting the blade rubber, a central part or body which within it contains one or more metal or hard polymer strips that give the blade an intrinsic curvature and finally, a spoiler in the form of an aerodynamic profile that uses the wind created by the speed of the vehicle to apply a force that keeps the blade against the windshield.

The blade rubber is of triangular overall shape tapering toward the bottom with the bottom vertex moving over the windshield and the top side attached by an elastic thin band to the body of the blade. This thin band, by deforming, allows the blade rubber to angle itself toward the windshield, in one direction and then the other, as the blade moves back and forth.

The central part generally has the shape, in cross section, of a square or a rectangle, the sides of which run parallel and perpendicular to the windshield. The lowermost part of this body generally comprises two tabs running parallel to the windshield and forming an elastic end stop for the blade rubber as the latter inclines itself to one side or the other toward the windshield. The body of the blade also at its center has one or two grooves running parallel to the windshield, and into which groove or grooves the rigid strip or strips that give the blade its intrinsic curvature are slid. Traditionally, the strip or strips are surrounded with elastomeric material continuously with the body of the blade but they may also, in certain configurations, be positioned one on each side of a plane of symmetry of the body and project laterally from said body to a greater or lesser extent.

The spoiler generally has the form of a three-sided aileron, the first side of which rests on the body of the blade, the second side of which diverges from the windshield and the third side of which has the shape of an aerodynamic profile with a concave face facing upward to form a surface on which the incident airflow impinges.

The designer of a semi-rigid wiper blade needs to take into consideration a certain number of constraints which include the magnitude of the various aerodynamic forces applied to the blade and the impact that these forces have on how well the blade is kept pressed against the windshield, this being irrespective of the vehicle speed, at least within certain limits. The resultant of these aerodynamic forces is broken down into a first force, referred to as the lift force, and a second force, referred to as the drag force. By convention, in the technical field of the invention, lift is measured in a direction perpendicular to the windshield whereas drag is measured in the direction tangential to the windshield, transverse to the longitudinal elongation of the blade.

Lift is the result, firstly, of aerodynamic loadings applied to the blade rubber and to the body of the blade, the resultant of which is generally directed upward and, secondly, of the action of the air on the spoiler, the vertical component of which is directed downward. The resultant lift may thus be directed upward and oppose the force of a spring that presses the blade against the windshield, or downward and combine with the force of said spring, depending on the shape and position of the spoiler. Ideally, this resultant lift needs to have a direction oriented downward, or failing that directed only slightly upward. Lift that is not directed sufficiently downward may cause the blade to separate from the surface of the windshield and therefore lead to defective wiping, whereas lift oriented too strongly downward increases the friction force against the windshield and therefore the power that the wiper motor has to provide.

As far as drag is concerned, this is in all instances directed in the direction of the wind passing over the windshield. It pushes against the blade and therefore works in support of the torque supplied by the wiper motor during the phase of opening the blade but opposes this torque during the closure phase. It therefore follows that it is preferable to obtain a drag that is as low as possible in order to reduce the power consumption of the wiper motor.

It is an object of the present invention to propose a semi-rigid wiper blade that allows a reduction in the power consumption of the wiper motor in comparison with existing models, while at the same time maintaining lift that is suited to keeping the blade pressed against the windshield.

To achieve that, the invention resorts to a blade comprising a part defined as forming a mirror image, about a vertical plane passing through a lower end of a blade rubber of the blade, of that part of the body that is situated upstream of this same vertical plane. The objective of such a definition is merely to provide a limit to the extension of part of the blade, in the direction of the air flow. Thus, the invention will apply just as well to blades in which said mirror-image-forming part actually is symmetrical with that part of the body that is situated upstream of the vertical plane passing through the lower end of the blade rubber of the blade as it will to blades in which said mirror-image-forming part is virtual, i.e., blades in which the mirror-image-forming part is not symmetric with that part of the body that is situated upstream of the plane passing through the lower end of the blade rubber of the blade but is of some arbitrary shape.

More specifically, the subject of the invention is a wiper blade for the windshield of a vehicle, notably a motor vehicle, comprising a blade rubber, a body to which said blade rubber is attached, and a spoiler extending from said body and having an aerodynamic profile between a leading edge and a trailing edge, the blade having a boundary between the body and the spoiler that is defined by a horizontal surface passing through the leading edge of said profile, characterized in that said spoiler extends horizontally downstream beyond a part, virtual or otherwise, defined as forming the mirror image, about a vertical plane passing through a lower end of the blade rubber, of that part of the body that is situated upstream of this same vertical plane.

Offsetting the spoiler makes it possible to improve, in terms of magnitude and in terms of direction, the action of the aerodynamic lift force created by this spoiler and therefore makes it possible to reduce the height of the blade without causing it to lose its wiping effectiveness.

For example, the blade rubber extends vertically tapering downward and/or the spoiler extends vertically, said aerodynamic profile being situated on one of the faces of the spoiler that can be oriented to face into the wind passing over the windshield.

Advantageously, said body exhibits symmetry about said vertical plane, the virtual part then coinciding with the part situated downstream of this same vertical plane.

In one particular embodiment, the body bears at least one rigid strip extending horizontally, said strip or strips lying within said mirror-image-forming part and/or said upstream part.

In another embodiment, the body bears at least one rigid strip extending horizontally, at least one of said strips extending downstream beyond said mirror-image-forming part.

For preference, said strip extends as far as the downstream horizontal end of said spoiler. It thus provides support for the downstream part of the spoiler, which part is generally made of a flexible polymer.

In one particular embodiment, said aerodynamic profile has at least one point of inflection. In this way it is possible to optimize the aerodynamic profile and, as a result, the magnitude and orientation of the aerodynamic force it generates.

Advantageously, said point of inflection is situated in line with the mirror-image-forming part. More advantageously still, the profile has a planar part upstream of the point of inflection.

The invention will be better understood and other objects, details, features and advantages thereof will become more clearly apparent during the course of the detailed explanatory description which will follow, of a number of embodiments of the invention which are given by way of purely illustrative and nonlimiting examples with reference to the attached schematic drawings.

Throughout the description the terms top and bottom refer to a greater or lesser distance between the relevant point and the windshield and the terms upstream or downstream refer to the direction in which the air flows over the windshield. Finally, the terms vertical and horizontal refer to the directions perpendicular and tangential to the windshield at the point at which the wiper blade is located.

Figure 1:
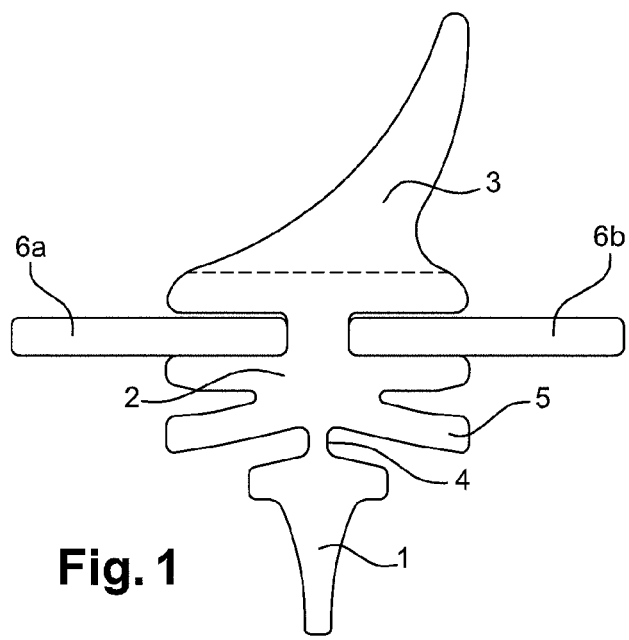
FIG. 1 is a view in cross section of a first wiper blade according to the prior art.

Reference is made to FIG. 1 which shows, in section, a first wiper blade according to the prior art comprising, from the bottom up, a blade rubber 1, a body 2 and a spoiler 3. The blade rubber 1 is substantially in the shape of an isosceles triangle with the vertex positioned at the bottom and the function of which is to wipe the windshield to remove the water thereon. This blade rubber 1 is positioned in the plane of symmetry of the body 2 of the blade to which it is attached by a flexible thin band 4, which allows the blade rubber to incline toward the upstream or toward the downstream direction depending on the direction of rotation of the blade in its back and forth movement. This inclination movement is, however, limited by two elastic tabs 5 which extend substantially horizontally from the plane of symmetry of the body 2, respectively in the upstream and in the downstream directions, to act as elastic end stops and limit the extent to which the blade rubber can rotate about the thin band 4.

The body 2 has a substantially parallelepipedal shape in which the sides of the rectangle, in cross section, are horizontal and vertical. The central part of this body is cut with two horizontal slots, in the form of grooves, into which two rigid strips 6a and 6b, referred to as backing strips, likewise horizontal, are inserted and provide the blade with an intrinsic curvature that allows it to press against the windshield, even in the case of a curved windshield. In the prior art depicted here, the rigid strips 6a and 6b are positioned facing one another, one on each side of the plane of symmetry of the body 2.

The spoiler 3 forms the upper part of the blade and constitutes an asymmetric part situated above the symmetric part that the actual body 2 proper forms. In order to gain a better visual appreciation of the body and to differentiate it from the spoiler, a dashed line has been marked on the figures to show the physical boundary of each of these two elements, this boundary corresponding to a horizontal surface passing through the leading edge of the aerodynamic profile of the spoiler 3. The spoiler extends inside a right-angled triangle of which the first side, that forms the base, rests on the body 2, of which the second side forms a substantially vertical downstream face and of which the third side, or hypotenuse, forms a face facing into the wind and having an aerodynamic profile chosen to optimize, in terms of strength and in terms of direction, the aerodynamic forces generated by the stream of air flowing over the windshield. In this prior art, the spoiler 3 is wholly positioned on top of the body 2 and its rigid strips 6a and 6b.

Figure 2:
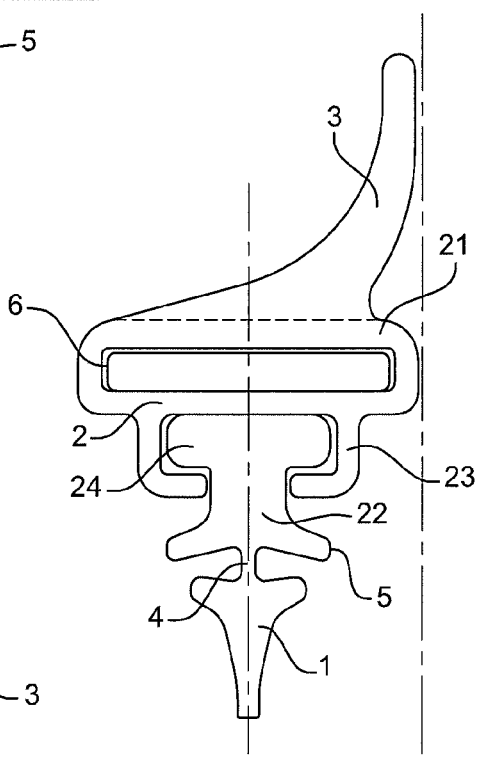
FIG. 2 is a view in cross section of a second wiper blade according to the prior art.

FIG. 2 depicts another version of a wiper blade of the prior art. In this version, the body 2 is made in two parts, to allow the blade rubber to be replaced without having to scrap the entire blade. To do that, the body 2 first of all comprises an upper body 21 containing a one-piece rigid strip 6 which extends downwards to form two rails 23 into which a blade rubber support 24 of parallelepipedal shape can be slid. It also comprises a lower body 22 consisting of the blade rubber support and of two elastic tabs 5 which perform the same function as those of the blade of FIG. 1. As before, the body 2, via its lower body 22, bears a blade rubber 1 which is attached to the blade rubber support 24 by a flexible thin band 4. It will be noted that, once again, in this second version of the prior art, the spoiler 3 is wholly positioned vertically above the body 2 and its rigid strip 6.

Figure 3:
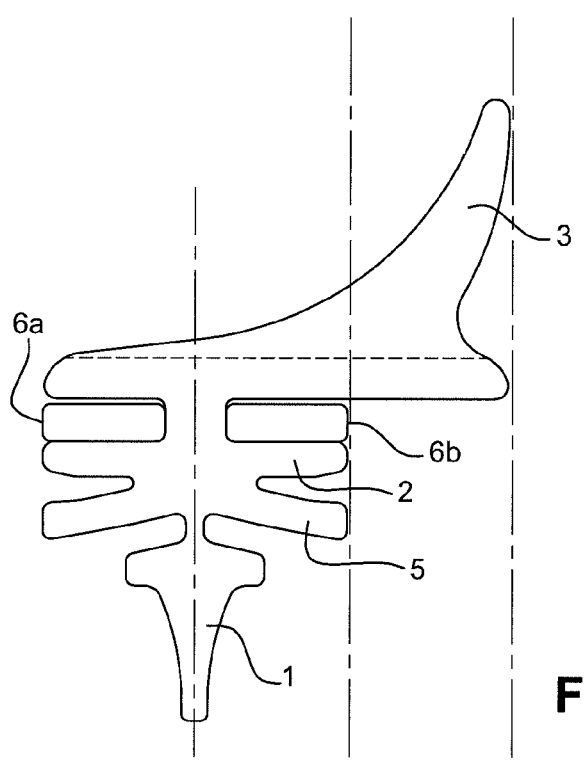
FIG. 3 is a view in cross section of a wiper blade according to a first embodiment of the invention.
Figure 4:
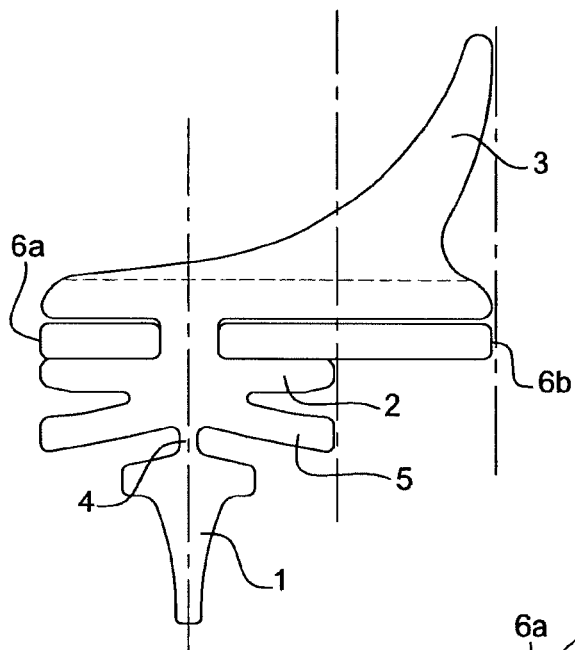
FIG. 4 is a view in cross section of a wiper blade according to a second embodiment of the invention.
Figure 5:
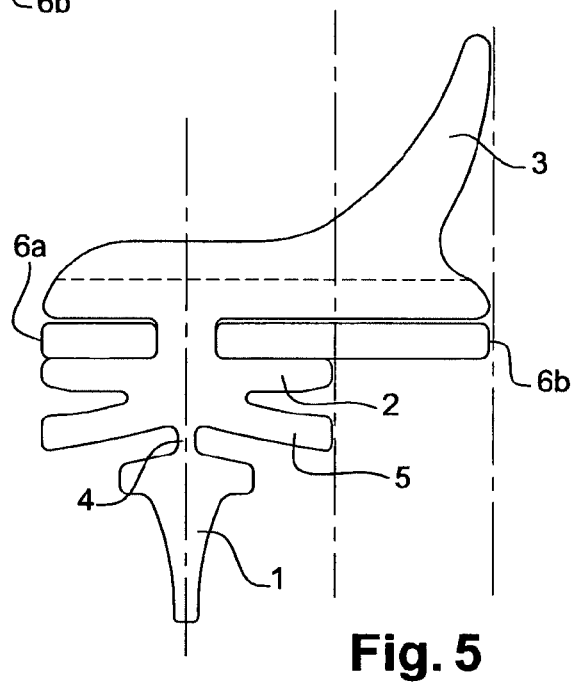
FIG. 5 depicts an alternative form of the wiper blade of the second embodiment.

FIGS. 3 to 5 show wiper blades similar to that of FIG. 1 but to which improvements according to the invention have been made. These first and second embodiments of the invention also comprise a blade rubber 1 of triangular shape attached by a thin band 4 to a one-piece body 2 bearing two elastic strips 5, and a spoiler 3 secured to the upper face of the body 2. Unlike in the prior art, the spoiler 3 is offset in the downstream direction and as a result leaves the horizontal span of the body 2. The profile of the side that forms the hypotenuse is substantially the same as in the prior art, with an upstream extension to take account of this extended horizontal span.

As for the rigid strips, the upstream strip 6a, in all three figures, is of reduced width so that it remains within the horizontal span of the body, whereas the downstream strip 6b differs between the two embodiments. In the first embodiment, depicted in FIG. 3, the downstream strip 6b has, like the upstream strip 6a, a reduced width, restricted to the span of the body 2. In the second embodiment on the other hand it has an increased width and extends downstream as far as the spoiler 3 does. It thus provides support for the offset part of the spoiler and prevents the deformations that could arise as a result of the force applied by the wind flowing over the windshield. In both instances, the most downstream part of the spoiler extends beyond the downstream part of the body 2 or, more precisely, taking the extension of the strip 6b into consideration, extends beyond that part of the body 2 which forms a mirror image, about the vertical mid-plane of the blade rubber, of that part of it that is situated upstream of this plane of symmetry. The mid-plane of the blade rubber is depicted in the figures as a chain line, whereas the plane that forms the downstream boundary of the mirror-image part is indicated using a dotted line.

In FIG. 5, the blade differs from that of FIG. 4 in that it has a different aerodynamic profile on its third side. To improve the magnitude and orientation of the aerodynamic force it generates toward the windshield, this profile has a point of inflection, here situated above the part that forms a mirror image of the upstream part. A planar part, parallel to the second side, is provided upstream of said point of inflection. The increase in the length of the third side that the invention affords thus gives greater freedom in choosing the shape to be given to the aerodynamic profile and notably allows profiles that have at least one point of inflection, something that the spoilers of the prior art did not always permit.

Figure 6:
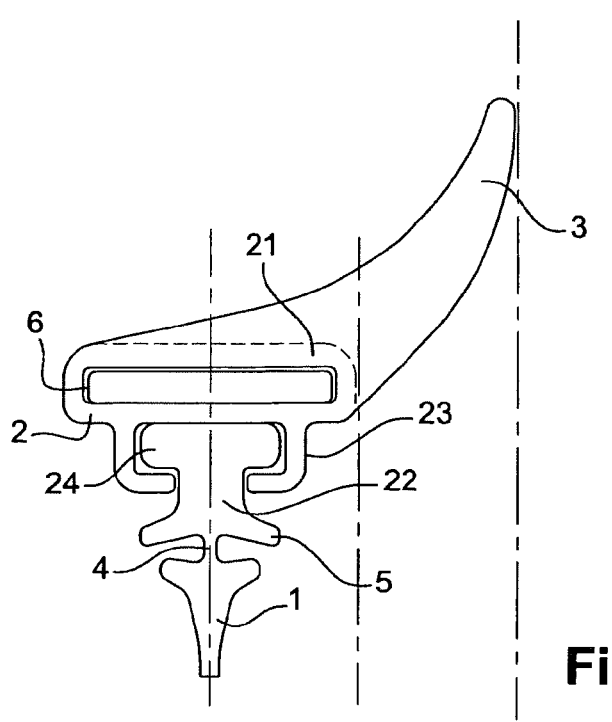
FIG. 6 is a view in cross section of a wiper blade according to a third embodiment of the invention.
Figure 7:
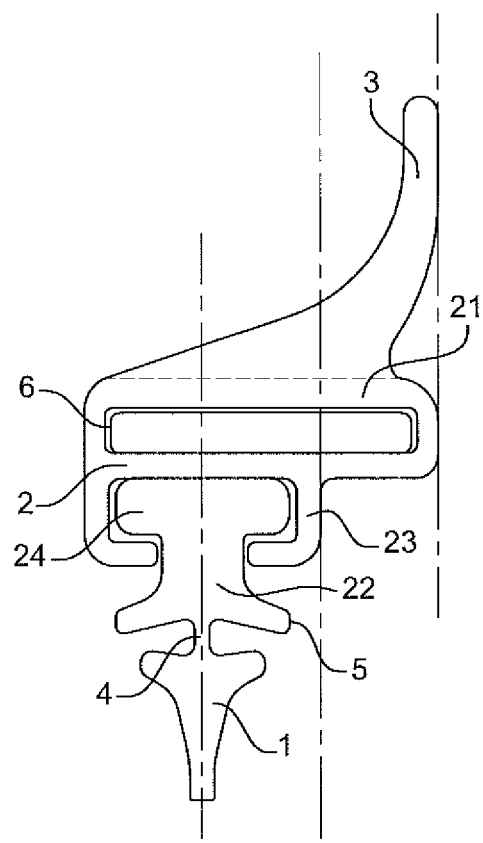
FIG. 7 is a view in cross section of a wiper blade according to a fourth embodiment of the invention.

Likewise, FIGS. 6 and 7 show wiper blades similar to that of FIG. 2 but to which improvements in accordance with the invention have been made. These third and fourth embodiments of the invention likewise comprise a blade rubber 1 of triangular shape, attached by a thin band 4 to a body 2 made up of an upper body 21 and of a lower body 22, and a spoiler 3 placed on the upper face of the body 2. As before, the upper body encloses a one-piece rigid strip 6 and extends downward to form two rails 23 into which a blade rubber support 24 is slid. As for the lower body 22 it likewise consists of the blade rubber support 24 and of two elastic tabs 5 identical to those of the blade of FIG. 2.

As in the first and second embodiments, the spoiler 3 is offset downstream and is outside of the horizontal span of the body 2; the profile of the side that forms the hypotenuse of the triangle is adapted, with an upstream extension, to take account of its elongated horizontal span. The upstream part of the strip 6 in both embodiments is of reduced width so that it remains within the horizontal span of the body, whereas its downstream part differs between the two embodiments. In the third embodiment depicted in FIG. 6, the downstream part, like the upstream part, has a reduced width limited to the span of the body 2. In the fourth embodiment depicted in FIG. 7 on the other hand it has an increased width and supports the spoiler in the downstream direction. Once again, in both these two embodiments, the most downstream part of the spoiler 3 protrudes beyond that part of the body 2 which forms a mirror image, in the vertical mid-plane of the blade rubber, of its part that is situated upstream of this plane of symmetry.

In FIG. 6, the mirror-image-forming part is real, the blade rubber 1 and the body 2 being symmetric about a vertical plane passing through a lower end of a blade rubber of the blade, in this instance the mid-plane of the blade. In FIGS. 3, 4, 5 and 7 it is virtual, the body 2, particularly that part of the body 2 that lies near the leading edge of the spoiler 3, or even the backing strips 6a, 6b, not being symmetric about said plane.

The benefit afforded by the invention will now be described by comparing the various embodiments against the prior arts illustrated in FIGS. 1 and 2.

The drag caused by a blade, whatever its configuration, is roughly directly proportional to the frontal cross-sectional area presented to the wind flowing over the windshield. To decrease that, it is therefore appropriate to reduce the vertical amplitude of the blade and, to do that, one method is to reduce the height of the spoiler 3 on the body 2. One of the disadvantages associated with this reduction stems from a corresponding reduction in the force applied toward the windshield by this same spoiler and therefore from the possibility that the pressing force applied by the blade may be insufficient.

To remedy this disadvantage, the invention proposes to increase the magnitude of the pressing force again by lengthening the horizontal width of the spoiler. By offsetting the spoiler 3 backward, and by causing it to overstep the boundaries of a body that is the mirror image of the upstream part of the body 2, the length of the third side of the aerodynamic aileron is increased without increasing the length of the second side. The drag generated remains low because the aerodynamic profile is not increased again. By contrast, offsetting the spoiler alters the position of the chord of the aerodynamic profile, i.e. the line joining the leading edge of this profile, which lies where the spoiler 3 and the body 2 meet at the upstream side, and the trailing edge, which is situated at the vertical end of the downstream edge of the spoiler 3. This is, first of all, longer than it was in the prior art and, secondly, more flat against the windshield. These two effects are such that the resultant of the aerodynamic forces applied to this profile is, on the one hand, increased in terms of magnitude, allowing it to regain, or even exceed, the magnitude it had in the prior art and, on the other hand, oriented more downward which improves its vertical component and contributes to improving the force with which the blade is pressed against the windshield.

The invention has been described with blade bodies that have a vertical plane of symmetry and with a blade rubber which is likewise symmetric, the two planes of symmetry coinciding. Because the invention relates to the offsetting of the spoiler in the downstream direction relative to the body 2, it can also be implemented on bodies of non-parallelepipedal shape and on blade rubbers of more complex shape. In order to assess how the invention can be implemented in such configurations, the plane of symmetry of the blade rubber is replaced by a vertical plane, referred to as the mid-plane, which passes through the lower end of said blade rubber. The downstream part of the body 2 in relation to this mid-plane is replaced by the mirror image of the upstream part about this mid-plane.

The blade according to the invention will be fitted with spoilers as described above, over all or part of its length. Said spoiler may thus, for example, be interrupted at the connection where the blade is attached to its driving arm and/or at its longitudinal ends, to leave space for connectors and/or end pieces.

Finally it may be pointed out that in the versions of the prior art, the upstream strip 6a in the case of FIG. 1, like the upstream part of the single strip 6 in the case of FIG. 2, are produced with a relatively large width by comparison with the versions depicted in FIGS. 3 to 5 and 7. In the case of FIG. 1, the strip 6a extends upstream beyond the body 2; in the case of FIG. 2, the rigid strip 6 projects upstream beyond the rails 23, i.e. beyond that part of the body 2 that is strictly required for holding the lower part 22. By shortening the upstream part of the rigid strips in this way, the embodiments of the invention mentioned above contribute to reducing the influence that the strips have on the path taken by the air flowing over the windshield and to preventing the creation of turbulence between the rigid strip and the windshield, which turbulence could increase the magnitude of the aerodynamic force that tends to cause the blade to separate from the windshield.

The shortening of the upstream part of the rigid strip or strips thus constitutes a further improvement made to the wiper blades by comparison with those of the prior art, by providing a solution to a second technical problem which is that of reducing as far as possible the influence that the elements that make up the body of the blade have on the component of the lift force which is oriented downward. The version depicted in FIGS. 3 to 5 and 7 to this effect constitutes a preferred embodiment in so far as the rigid strip 6a or 6 does not extend upstream beyond the part of the body 2 that holds the blade rubber 1 and the elastic strips 5.

That being the case, such a solution could also be used with blades the spoilers of which are not necessarily offset in the downstream direction. In other words, the invention also relates to wiper blades for the windshield of vehicles, notably motor vehicles, that comprise a blade rubber 1, a body 2 to which said blade rubber 1 is attached, and one or more backing strips 6, 6a, 6b and in which the upstream extension of said backing strips 6, 6a is limited to the upstream extension of said body 1.

The invention claimed is:

1. A wiper blade for the windshield of a motor vehicle, comprising:
    a blade rubber;
    an upper body containing a one piece rigid strip and two downward-extending rails; and
    a lower body,
        wherein the two rails removably hold the lower body, and wherein the blade rubber is affixed to the lower body; and
    a spoiler extending from the upper body and having an aerodynamic profile between a leading edge and a trailing edge, the blade having a boundary between the upper body and the spoiler that is defined by a horizontal surface passing through the leading edge of said profile,
    wherein said spoiler extends horizontally downstream beyond the upper body, the upper body being at least partially mirror-symmetric about a vertical plane passing through a lower end of the blade rubber, and the lower body being fully mirror-symmetric about the vertical plane; and
    wherein said spoiler comprises a downwind surface that extends from below the one piece rigid strip to the trailing edge in an entirely convex curve.

2. The wiper blade as claimed in claim 1, wherein the upper body extends horizontally downstream beyond the lower body.

* * * * *